United States Patent
Kato et al.

(10) Patent No.: US 6,547,115 B1
(45) Date of Patent: Apr. 15, 2003

(54) BICYCLE TRANSPORTING DEVICE FOR VEHICLE

(75) Inventors: Tadahiko Kato, 667-20, Doida-cho, Matsuyama-shi, Ehime 790-0056 (JP); Tadashi Iura, Ehime (JP); Kazuki Mori, Ehime (JP)

(73) Assignee: Tadahiko Kato, Matsuyama (JP)

( * ) Notice: Subject to any disclaimer, the term of this patent is extended or adjusted under 35 U.S.C. 154(b) by 0 days.

(21) Appl. No.: 09/701,863

(22) PCT Filed: May 19, 1999

(86) PCT No.: PCT/JP99/02621

§ 371 (c)(1),
(2), (4) Date: Dec. 5, 2000

(87) PCT Pub. No.: WO99/64272

PCT Pub. Date: Dec. 16, 1999

(30) Foreign Application Priority Data

Jun. 5, 1998 (JP) .............................. 10-194941

(51) Int. Cl.⁷ .................................................. B60R 9/00
(52) U.S. Cl. ...................... 224/496; 224/311; 224/497; 224/501; 224/504; 224/924
(58) Field of Search ................................. 224/924, 311, 224/495, 496, 497, 500, 501, 502, 504, 556; 414/462

(56) References Cited

U.S. PATENT DOCUMENTS

| 2,576,222 A | * | 11/1951 | Hill |
| 2,772,041 A | * | 11/1956 | Zeabari |
| 2,953,287 A | * | 9/1960 | Werner |
| 3,240,406 A | * | 3/1966 | Logan |
| 3,627,158 A | * | 12/1971 | Kobasic |
| 3,807,592 A | * | 4/1974 | Lynn et al. .................. 414/462 |
| 4,073,395 A | * | 2/1978 | Clement |
| 4,461,413 A | | 7/1984 | Hoerner |
| 4,671,729 A | * | 6/1987 | McFarland ..................... 410/3 |
| 4,753,567 A | * | 6/1988 | Achee, Sr. .................. 224/542 |
| 5,950,891 A | * | 9/1999 | Brungardt et al. |

FOREIGN PATENT DOCUMENTS

| JP | 47-36351 | 11/1972 |
| JP | 51-45737 | 10/1974 |
| JP | 63-21164 | 2/1988 |
| JP | 6-39607 | 5/1994 |
| JP | 8-175276 | 7/1996 |

* cited by examiner

Primary Examiner—Stephen K. Cronin
(74) Attorney, Agent, or Firm—Armstrong, Westerman & Hattori, LLP

(57) ABSTRACT

A car-mounted bicycle or wheelchair carrier that enables a bicycle to be easily and quickly loaded and unloaded, that can be completely stored in the trunk in a compact fashion when it is not being used and be removed from the trunk in a one-step operation, that can be easily mounted to any existing cars, that can reliably immobilize a bicycle or wheelchair when the car is being driven, that can be applied to various types of bicycles as well as to wheelchairs, and that can be manufactured at low cost.

11 Claims, 6 Drawing Sheets

BICYCLE TRANSPORTING DEVICE FOR VEHICLE

BACKGROUND OF THE INVENTION

1. Field of the Invention

The present invention relates to a bicycle or wheelchair carrier for a car, and more particularly to a car-mounted bicycle or wheelchair carrier that can be completely stored in the car trunk in a compact fashion when the bicycle, etc. is not being carried.

2. Description of the Related Art

Car-mounted bicycle or wheelchair carriers that transport bicycles while they are fixed to the roof of the car or suspended from a fairly high position at the rear of the car are conventionally known. However, in the case of a car-mounted bicycle or wheelchair carrier that fixes bicycles to the roof of the car, not only does it require a great deal of effort to lift a bicycle up to the car roof and take it down, where the lifter is a person of short stature, a ladder or other mechanism is often used, which entails the risk of falling over. In the case of a car-mounted bicycle or wheelchair carrier that suspends bicycles from a fairly high position at the rear of the car, the bicycle must be raised to and lowered from a fairly high position, which leads to the problem that mounting of a bicycle is difficult for one person such as a woman to perform, and there is also a risk of damage to the car. Furthermore, such carriers include carriers that cannot carry commonly used women's bicycles, as well as permanently mounted carriers that are difficult to attach and detach. In these cases, because the carrier is always protruding from the rear of the car, the problems arise that the carrier poses a hindrance to normal driving and parking, and that more time and effort are required to wash the car.

With regard to a car-mounted bicycle or wheelchair carrier, the following prior art is known. For example, Japanese Utility Model Publication No. S47-36351 discloses a car-mounted bicycle transport device in which one end is bent into an inwardly-facing U shape and engages with the bumper, and the microfilm of Japanese Utility Model Application No. S49-118320 (See Japanese Utility Model Laid-open No. S51-45737) discloses a car-mounted bicycle or wheelchair carrier equipped with a means that supports both the front and rear wheels and a part of the frame of the bicycle, as well as with a detachable frame that can be mounted to the rear bumper of the car. Both of these carriers are mounted to the metal bumper that protrudes from the rear of the car, and cannot be applied to the recent larger-sized composite resin bumpers, nor can they be completely stored in the car trunk in a compact fashion when they are not being used.

The specification for U.S. Pat. No. 4,461,413 discloses a bicycle carrier that can be stored in a car trunk when it is not being used, but because this carrier suspends the bicycle from the rear of the car, it entails the problem that the bicycle is difficult to load, and because the carrier is vertically high, when it is stored in the car trunk while unused, it can only be stored such that it leans diagonally in the trunk interior (FIG. 3), or such that it is stored in an unstable fashion along the interior surface of the trunk lid (FIG. 5), giving rise to the problems that (i) where the carrier leans diagonally in the trunk interior, the center of the trunk interior is taken up by the carrier and can no longer be freely used for its original purpose as a compartment to house packages, baggage, etc., and (ii) where the carrier is stored in an unstable fashion when the car is running, the carrier may be damaged through a collision between the carrier and the trunk lid interior surface.

SUMMARY OF THE INVENTION

With a view to further promoting the use of environmentally superior bicycles, the inventors of the present invention diligently investigated car-mounted bicycle or wheelchair carriers, and as a result selected the following items (1) through (6) as development concepts:

(1) A person of short stature or a woman can easily and quickly load or unload a bicycle.

(2) The carrier may be completely stored in the trunk in a compact fashion when it is not being used, and may be removed from the trunk in a one-step operation.

(3) The carrier may be easily mounted to an existing car without the need for special modifications.

(4) The bicycle or wheelchair is reliably fixed to the carrier when the car is run, and the car can run safely in such a state.

(5) The carrier can be applied to various types of bicycles as well as to wheelchairs.

(6) Use of the carrier does not damage the bicycle.

(7) The carrier can be manufactured at low cost.

In other words, an object of the present invention is to provide a superior car-mounted bicycle or wheelchair carrier to which a bicycle or wheelchair can be easily and quickly loaded or unloaded, that may be completely stored in the trunk in a compact fashion when it is not being used and may be removed from the trunk in a one-step operation, that may be easily mounted to an existing car, that can reliably immobilize a bicycle or wheelchair when the car is run, that can be applied to various types of bicycles as well as to wheelchairs, and that can be manufactured at low cost.

The inventors of the present invention diligently performed research in order to achieve the above object, and embarked on development of a car-mounted bicycle or wheelchair carrier that achieves the development concepts (1) through (6). The inventors learned that in order to achieve the above concept (1), the bicycle/wheelchair fixing part must be a lowloading type, and the suspension concept cannot be used. The inventors further learned that in order to achieve the above concept (2), a construction is necessary in which a bicycle/wheelchair rack rotatably mounted to a carrier fixing unit or units in the trunk is stored substantially parallel to the bottom of the trunk and has a height that is less than the rear wall of the trunk, and that a construction is preferred in which the positions of the rotating shaft pivots between the carrier fixing unit(s) and the bicycle/wheelchair rack can be adjusted in at least one of the front-back, lateral or vertical directions.

The inventors learned that in order to achieve the concept (3), it is desirable to use the bumper mounting mechanisms or the spare tire fixing mechanism in the trunk as a means for mounting the carrier. The inventors further learned that in order to achieve the concept (4), it is preferred both of the bicycle's wheels as well as the main frame be fixed to the carrier, that the bicycle be located as far below the rotating shaft pivots as possible, that the front wheel holder hold the front wheel such that the handlebars are turned, and that the number plate and taillights be mountable to the bicycle/wheelchair rack. The inventors further learned that in order to achieve the concept (5), it is preferred that the distance between the front and rear wheel holders be variable and that the mounting position and mounting angle of the frame fixing unit be adjustable so that the bicycle/wheelchair rack may be adjusted to accommodate various types and sizes of bicycles. The inventors further learned that in order to achieve the concept (6), it is preferred that buffer members be located between the bumper and the bicycle/wheelchair rack. Finally, the inventors learned that in order to achieve the concept (7), it is preferred that the carrier comprise assemblable components that are as few in number as possible, and that the existing structural features of the car be used. The present invention was ultimately arrived at based on an organic synthesis of these understandings.

In other words, the present invention relates to a car-mounted bicycle or wheelchair carrier having a carrier fixing unit or units that can be mounted inside the car trunk and a bicycle/wheelchair rack that is rotatably connected to said carrier fixing unit(s), wherein when the bicycle/wheelchair rack is stored inside the trunk, it is lower than the trunk rear wall and runs substantially along the bottom of the trunk (first aspect), car-mounted bicycle or wheelchair carrier according to the first aspect, wherein said carrier fixing unit(s) may be mounted using the bumper mounting mechanisms at the trunk rear wall (second aspect), car-mounted bicycle or wheelchair carrier according to the first aspect, wherein said carrier fixing unit(s) may be mounted using the spare tire fixing mechanism inside the trunk (third aspect), the car-mounted bicycle or wheelchair carrier according to any of the first to third aspects, wherein the position of each rotating shaft pivot between the carrier fixing unit(s) and the bicycle/wheelchair rack may be adjusted in at least one of the front-back, lateral or vertical directions (fourth aspect), the car-mounted bicycle or wheelchair carrier according to any of the first to fourth aspects, wherein said bicycle/wheelchair rack has at its end areas near the rotating shaft pivots two plate members that clear the top edge of the trunk rear wall (fifth aspect), the car-mounted bicycle or wheelchair carrier according to any of the first to fifth aspects, wherein said bicycle/wheelchair rack has buffer members that can make contact with the car bumper (sixth aspect), the car-mounted bicycle or wheelchair carrier according to any of the first to sixth aspects, wherein the bicycle/wheelchair rack has the front wheel holder, the rear wheel holder, and an adjusting means for adjusting the distance therebetween in accordance with the distance between the front and rear wheels of the bicycle, as well as a frame fixing unit that immobilizes the frame of the bicycle (seventh aspect), the car-mounted bicycle or wheelchair carrier according to any of the first to seventh aspects, wherein said bicycle/wheelchair rack has a front wheel holder that holds the front wheel of the bicycle such that the handlebars are turned and a rear wheel holder that holds the rear wheel such that it is parallel to the rear surface of the trunk, as well as clamping means for fixing the front and rear wheels to the front and rear wheel holders, respectively (eighth aspects), car-mounted bicycle or wheelchair carrier according to any of the first to sixth aspects, wherein said bicycle/wheelchair rack has one or two wheelchair wheel holders located parallel to the trunk rear surface, as well as a frame fixing unit that fixes the wheelchair frame (ninth aspect), the car-mounted bicycle or wheelchair carrier according to any of the first to ninth aspects, wherein said bicycle/wheelchair rack has a number plate and/or taillights (tenth aspect), or to the car-mounted bicycle or wheelchair carrier according to any of the first to tenth aspects, wherein said carrier fixing unit(s) and bicycle/wheelchair rack comprise assemblable parts (eleventh aspect).

The present invention relates to a car-mounted bicycle or wheelchair carrier having a carrier fixing unit or units that are mounted at a prescribed position or positions in the interior of the car trunk and a bicycle/wheelchair rack that is rotatably connected to the carrier fixing unit(s), and that is constructed such that when the bicycle/wheelchair rack is stored in the trunk, it is lower than the rear wall of the trunk and runs substantially along the bottom thereof, wherein (i) said carrier fixing unit(s) have adjusting means permitting adjustment of the positions of the rotating shaft pivots between the carrier fixing unit(s) and the bicycle/wheelchair rack in at least one of the front-back, lateral or vertical directions, (ii) said bicycle/wheelchair rack has a wheel holder pipe and a frame fixing pipe that are parallel to each other, vertical frame pipes that are perpendicular to these pipes and parallel to each other, and two plate members that are integrally formed with the ends of the vertical frame pipes near the rotating shaft pivots, and shaped such that they clear the top edge of the trunk rear wall, (iii) said wheel holder pipe has (1) a front wheel holder that holds the front wheel of the bicycle such that the handlebars are turned, a rear wheel holder that holds the rear wheel such that it is parallel to the rear surface of the trunk, and adjusting means for adjusting the distance between the front and rear wheel holders in accordance with the distance between the front and rear wheels of the bicycle, and/or (2) a wheelchair wheel holder, (iv) said frame fixing pipe has a frame fixing arm that is rotatably fixed at any desired position along the frame fixing pipe, (v) said vertical frame pipes each have a buffer member located between the vertical frame pipe and the bumper, and (vi) said car-mounted bicycle or wheelchair carrier also has clamping means for fixing the front and rear wheels to their respective front and rear wheel holders (claim 12).

In the present invention, the carrier fixing unit(s) that can be mounted inside the car trunk may have any construction so long as they have a mounting means for mounting the carrier fixing unit(s) to a prescribed area inside the trunk, as well as rotating means, such as rotating shafts or bearings, to enable the bicycle/wheelchair rack to revolve around the rotating means. As the prescribed area inside the trunk, any area to which the carrier fixing unit(s) may be mounted is acceptable, but it is preferred that the bumper mounting mechanisms or the spare tire fixing mechanism inside the trunk be used so that the carrier fixing unit(s) may be mounted without requiring special modifications to be carried out on an existing car. Where the bumper mounting mechanisms or the spare tire fixing mechanism inside the trunk is used as the mounting area, the carrier fixing unit(s) may be easily mounted by removing existing bolts or other fastening pieces and re-inserting said bolts or other fastening pieces through holes or notches in the carrier fixing unit(s).

In the carrier fixing unit(s) of the present invention, including the case in which the bumper mounting area or the spare tire fixing area inside the trunk is used as the area to which the carrier fixing unit(s)are mounted, it is preferred that the carrier fixing unit(s) have an adjusting means that enables the rotating shaft pivots between the carrier fixing unit(s) and the bicycle/wheelchair rack to be adjusted either in the front-back, lateral or vertical directions, and ideally in all three directions. One possible construction to achieve this adjusting means involves the carrier fixing unit(s) comprising multiple members, in each of which is located a slit aligned in the front-back, lateral or vertical direction, wherein said slits engage with engaging members at appropriate locations in the slit. Through the use of such an adjusting means, the carrier fixing unit(s) and the bicycle/wheelchair rack may be set in an appropriate position in the trunk of various types of cars, which, when the bicycle/wheelchair rack is stored in the trunk, contributes significantly to enabling the bicycle/wheelchair rack to be stored at a height lower than the rear wall of the trunk and such that it runs substantially along the bottom of the trunk.

Any construction is acceptable for the bicycle/wheelchair rack of the present invention, so long as the bicycle/wheelchair rack is rotatably connected to the carrier fixing unit(s) by rotating means, such as rotating shafts or bearings, and has a configuration such that when the bicycle/wheelchair rack is stored inside the trunk, it is lower than the trunk rear wall and runs substantially along the bottom of the trunk. The bicycle/wheelchair rack may comprise, for example, a wheel holder pipe and a frame fixing pipe that are parallel to each other, vertical frame pipes that are perpendicular to these pipes and parallel to each other, and two plate members that are integrally formed with the ends of the vertical frame pipes near the rotating shaft pivots, and are shaped such that they clear the top edge of the trunk rear wall. A pipe material for each pipe member described above is selected such that it offers high strength relative to its weight, but appropriately-shaped long flat plate-shaped members having other shapes may also be used where necessary. At the same time, it is preferred that flat plates be used for the two plate members that clear the top edge of the trunk rear wall, so that rain water does not enter the trunk compartment when a bicycle is loaded onto the carrier.

A front wheel holder and a rear wheel holder are located on the wheel holder pipe so that the bicycle may be held. It is preferred that the front wheel holder be able to hold the front wheel such that the handlebars are turned, so that the width of the bicycle when it is loaded does not exceed the width of the car. The front wheel holder may also be constructed such that it can revolve around the pipe and be fixed when it is used. At the same time, it is preferred that the rear wheel holder be able to hold the rear wheel such that it is parallel to the trunk rear surface. It is further preferred that the front and rear wheel holders be constructed such that bicycles having various different tire sizes may be held in a stable fashion. It is also acceptable if one or two wheelchair wheel holders oriented parallel to the trunk rear surface are mounted, either in addition to the front and rear bicycle wheel holders or by themselves, to the wheel holder pipe so that wheelchairs may be loaded.

It is preferred that the vertical position of the wheel holder pipe be as low as possible so long as the operation of the car is not obstructed thereby. For example, by locating the wheel holder pipe at a height roughly equal to the height of the lower surface of the bumper, the bicycle or wheelchair may be easily lifted onto and off of the wheel holders, and the bicycle may be prevented from flying upward while the car is operating. Furthermore, it is preferred that the wheels held by the wheel holders, such as the front and rear wheels of a bicycle, be fixed by appropriate clamping means so that the wheels do not rattle or vibrate when the bicycle is being transported.

It is also preferred that the bicycle/wheelchair rack of the present invention have an adjusting means by which to adjust the distance between the front and rear wheel holders in accordance with the distance between the front and rear wheels of the bicycle so that bicycles of various sizes can be held in a stable fashion. A public-domain length adjustment mechanism, such as a mechanism using an auxiliary pipe mounted such that it can slide relative to the wheel holder pipe, may be used as the adjusting means.

Any type of frame fixing pipe having a frame fixing arm that can immobilize the bicycle frame may be used, but in order to enable application to various configurations of bicycles, as well as to permit compact storage in the trunk, it is preferred that the frame fixing pipe have a frame fixing arm that may be fixed at any lateral position on the frame fixing pipe and revolve upward or downward relative to the frame fixing pipe. Furthermore, a grip is normally located at one end of the frame fixing arm in order to fix the frame of the bicycle. When such a frame fixing arm is used, firm fixing of a wheelchair is also possible.

One example of the vertical frame pipes involves two parallel frame pipes constructed such that (i) a shaft or bearing is formed as a rotating means at the rotating shaft pivot at one end of each frame pipe, (ii) each frame pipe is integrally formed with a plate member shaped so that it clears the rear wall of the trunk, and (iii) the frame pipes are located such that they can fix and support the parallel wheel holder pipe and frame fixing pipe in order to enable them to revolve around the rotating shaft pivots where necessary. It is preferred that a buffer member that can make contact with the bumper be mounted on each vertical frame pipe. The mounting position of each buffer member on each vertical frame pipe may be made adjustable. The mounting of buffer members at the contact areas between the bumper and the bicycle/wheelchair holding unit ensures that no damage is caused to the car itself.

A number plate and/or taillights may be mounted at any desired position on the bicycle/wheelchair rack. By mounting a number plate and/or taillights onto the bicycle/wheelchair rack in this fashion, the number plate and taillights may be easily seen from the rear even when a bicycle, etc. is being transported.

The carrier fixing unit(s) and the bicycle/wheelchair rack may comprise assemblable components. This construction enables the car-mounted bicycle or wheelchair carrier to be easily detached from the car when it is not being used for an extended period, enables new components to be exchanged for damaged components, and enables all types of bicycles and wheelchairs to be transported by simple component replacement, which may be achieved through the use of several components that are of the same type but have different lengths.

When it is not being used to hold a bicycle or wheelchair, the car-mounted bicycle or wheelchair carrier pertaining to the present invention is configured such that the carrier fixing unit(s) mounted inside the car trunk and the bicycle/wheelchair rack stored inside the trunk are lower than the height of the trunk rear wall and are aligned substantially along the bottom of the trunk. When a bicycle or wheelchair is to be loaded onto the car-mounted bicycle or wheelchair carrier pertaining to the present invention, the bicycle/wheelchair rack is revolved around the rotating shafts and removed from the trunk, and is further revolved around the rotating shafts until the buffer members mounted to vertical frame pipes of the bicycle/wheelchair rack make contact with the bumper, such that a bicycle or wheelchair may be held on it.

When a bicycle is loaded onto the car-mounted bicycle or wheelchair carrier when it is in this state, the distance between the front and rear wheel holders located on the wheel holder pipe is adjusted in accordance with the distance between the front and rear wheels of the bicycle, the front and rear wheels are loaded onto the front and rear wheel holders, the frame fixing arm is moved along the frame fixing pipe so that it meets the portion of the frame extending from the bicycle seat area to the pedal area, and the bicycle frame is then fixed using the grip located at one end of the frame fixing arm, and locked to the frame fixing pipe such that neither end of the frame fixing arm can move. Finally, after the front wheel and the rear wheel are fixed snugly to the front wheel holder and the rear wheel holder using the respective clamping means, the bicycle is transported. Where a wheelchair is carried by the car-mounted bicycle or wheelchair carrier as well, for example, the wheelchair may be transported in the same way as a bicycle, except for that the main wheels of a folded-up wheelchair are carried on a wheel holder.

When the user is finished using the car-mounted bicycle or wheelchair carrier, after the bicycle is unloaded from the bicycle/wheelchair rack by following in reverse sequence the steps followed when the bicycle was loaded, by revolving the bicycle/wheelchair rack upward and forward, the bicycle/wheelchair rack can be stored in the trunk with a configuration such that it is lower than the rear wall of the trunk and runs substantially along the bottom of the trunk, without being removed from the car. By orienting in a roughly L-shaped fashion the front wheel holder that holds the front wheel such that the handlebars are turned and the rear wheel holder that holds the rear wheel parallel to the trunk rear surface, a bicycle may be transported such that the bicycle does not protrude beyond the width of the car.

DESCRIPTION OF THE PREFERRED EMBODIMENTS

Figure 1:
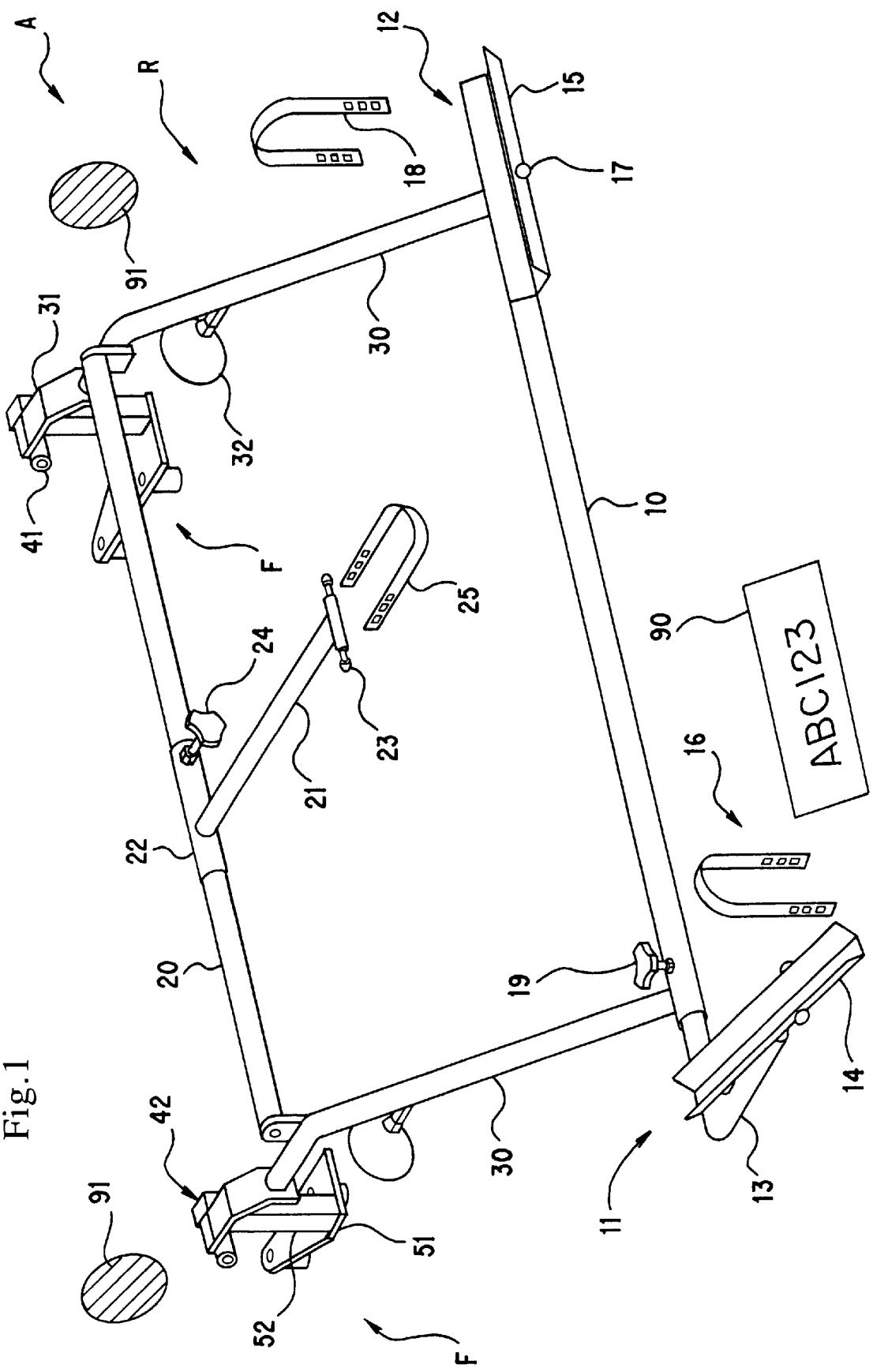
FIG. 1 a perspective view of one example of the car-mounted bicycle or wheelchair carrier pertaining to the present invention.

Embodiments of the present invention will be explained in detail below based on the drawings, but the technological scope of the present invention is not limited thereby.
Embodiment 1

As shown in FIGS. 1 through 6, the car-mounted bicycle or wheelchair carrier A comprises carrier fixing units F mounted inside the trunk T of the car C, and a bicycle/wheelchair rack R that holds the bicycle B and is rotatably connected to the carrier fixing units F. The bicycle/wheelchair rack R has a wheel holder pipe 10, a frame fixing pipe 20, and two vertical frame pipes 30. Because the construction of the components other than the wheel holders is the same regardless of whether a bicycle or a wheelchair is being transported, the embodiment below will be explained with a focus on the transport of a bicycle.

A front wheel holder 11 is fixed to one end of the wheel holder pipe 10 of the bicycle/wheelchair rack R such that the handlebars of the bicycle B are turned, and a rear wheel holder 12 is fixed to the other end such that it is aligned along the width of the car C, i.e., the front wheel holder 11 and the rear wheel holder 12 are fixed in a roughly L-shaped fashion, such that the length of the bicycle B when it is being carried does not exceed the width of the car C. The front wheel holder 11 comprises a roughly U-shaped rail 14 that opens at the top and is fixed to an L-shaped rail support pipe 13, and the rear wheel holder 12 comprises a roughly U-shaped rail 15 that opens at the top and is fixed to one end of the wheel holder pipe 10. The wheels carried on the wheel holders are fixed thereto using clamping means 16. These clamping means 16 fix the wheel through the engagement of pins 17 with belts 18 at the center side surfaces of the rails 14 and 15, respectively.

An adjusting means adjusts the distance between the front wheel holder 11 and the rear wheel holder 12 in accordance with the distance between the wheels of the bicycle. This adjusting means comprises a fixing bolt 19 inserted where the front wheel rail support pipe 13 slides inside the wheel holder pipe 10. When this fixing bolt 19 is loosened, the front wheel holder 11 can slide laterally relative to the car C and rotate using the wheel holder pipe 10 as the axis, and after adjustment is performed, the front wheel holder 11 can be secured in the adjusted position by tightening the fixing bolt 19. By appropriately adjusting the front wheel holder 11 using the adjusting means in this fashion, the distance between the front and rear wheel holders 11 and 12 can be adjusted in accordance with the distance between the wheels of different types of bicycles.

The frame fixing pipe 20 has a frame fixing arm 21 that immobilizes the frame of the bicycle B. At one end of the frame fixing arm 21 is a hollow cylinder 22 inside which the frame fixing pipe 20 can travel, while at the other end is a belt hook unit 23 that fixes the frame of the bicycle B. The hollow cylinder 22 has a fixing bolt 24, and the frame fixing arm 21 can be rotated up and down while sliding laterally along the frame fixing pipe 20, or can be fixed at any position on the frame fixing pipe 20, such that the frame fixing arm 21 can be fixed to the frame of the bicycle B regardless of the type of bicycle. The belt hook unit 23 works together with the fixing belt 25 to immobilize the frame of the bicycle B.

The vertical frame pipes 30 are fixed such that they extend forward and upward toward either end of the wheel holder pipe 10 that runs laterally relative to the car C. A plate member 31 shaped so that it clears the trunk wall of the car C is fixed to one end area of each vertical frame pipe 30, and the frame fixing pipe 20 that runs laterally relative to the car C is rotatably mounted between two protrusions, one of which is fixed near one end of each plate member 31 of each vertical frame pipe 30. Furthermore, a rotating shaft 41 is located at the end of either plate member 31 as a rotating means. A buffer member 32 is located in the area of contact between each vertical frame pipe 30 and the bumper P of the car C to prevent damage to the car C.

Figure 2:
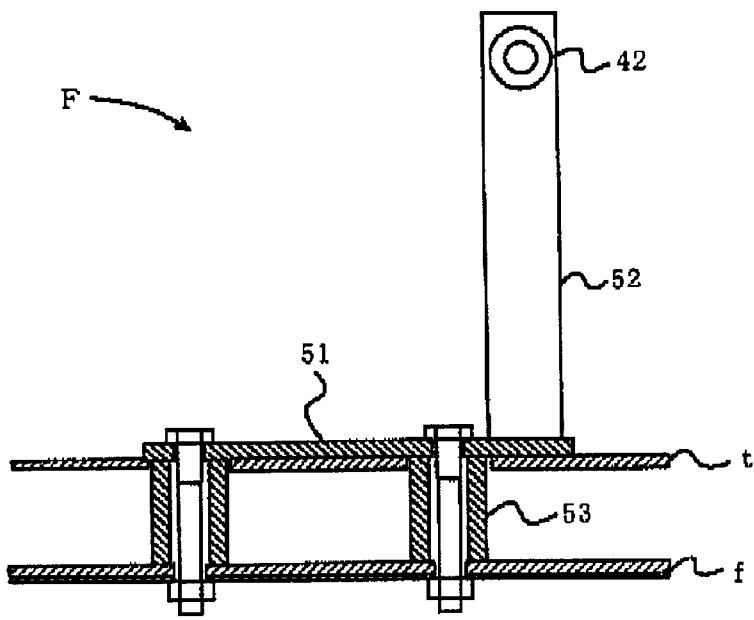
FIG. 2 is a side cross-section of the mounting unit of the car-mounted bicycle or wheelchair carrier pertaining to the present invention.
Figure 3:
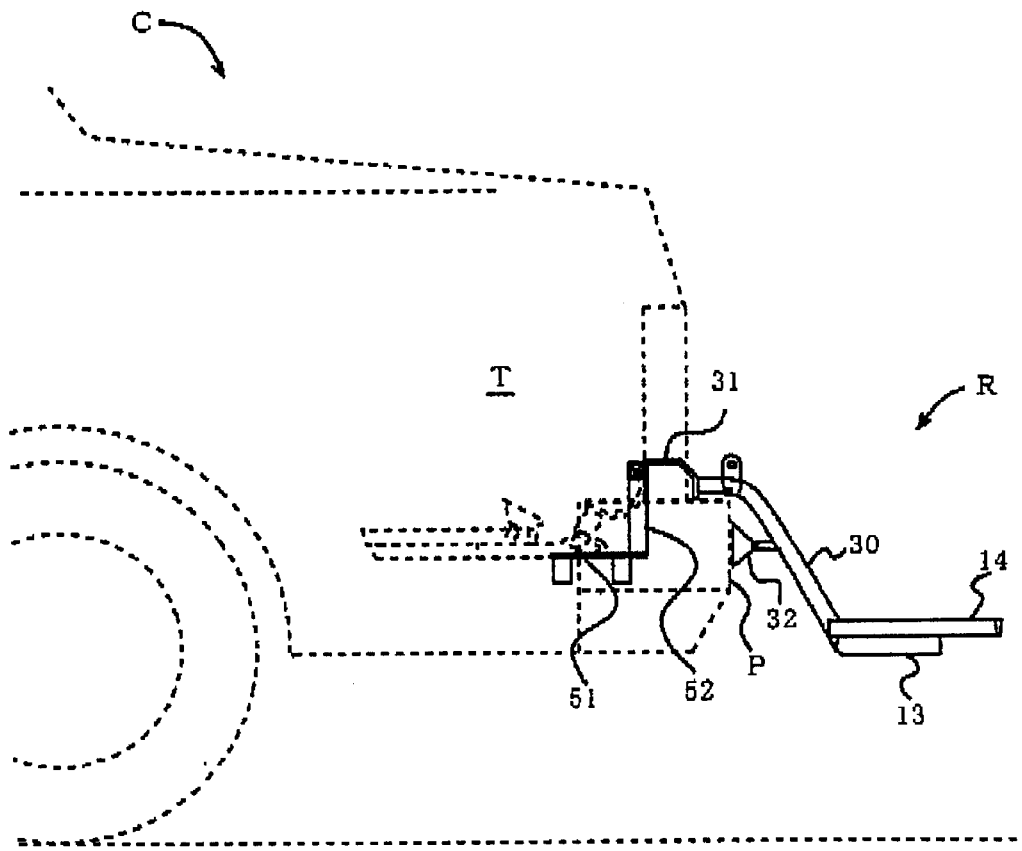
FIG. 3 is a side view of the car-mounted bicycle or wheelchair carrier pertaining to the present invention in a mounted state.
Figure 4:
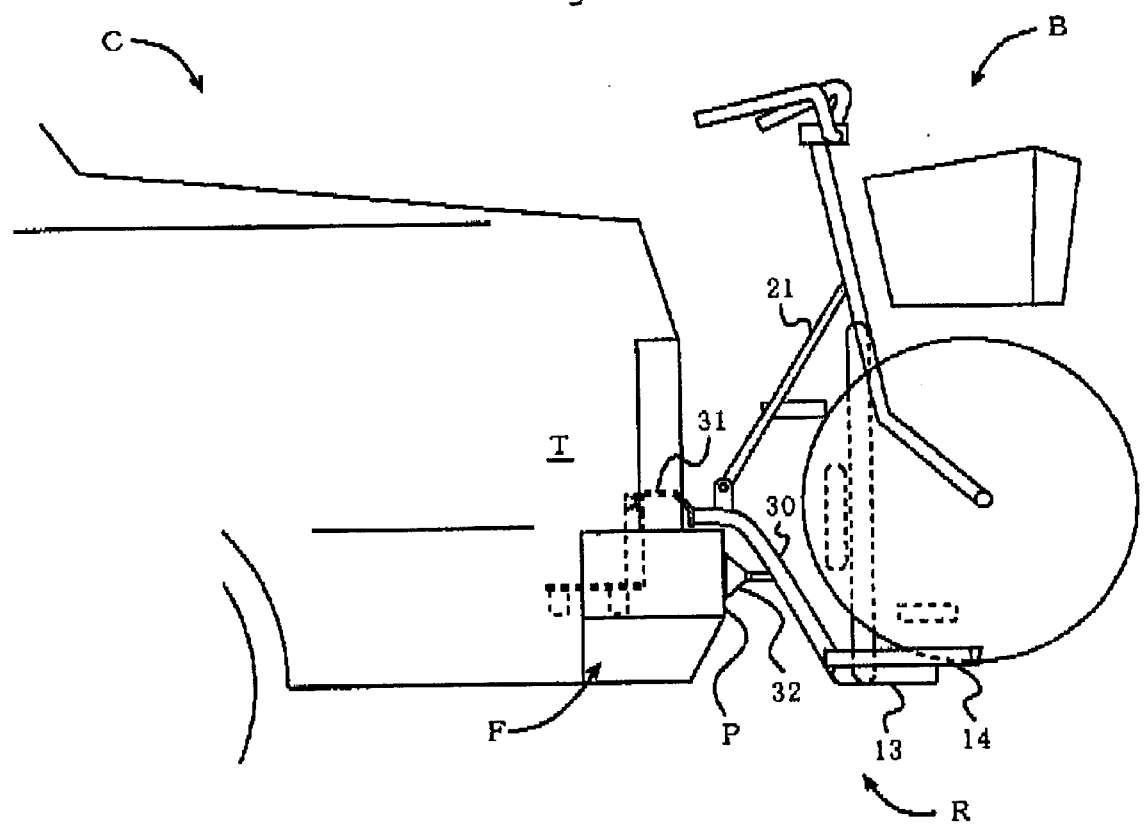
FIG. 4 is a side view showing the situation in which a bicycle is loaded.
Figure 5:
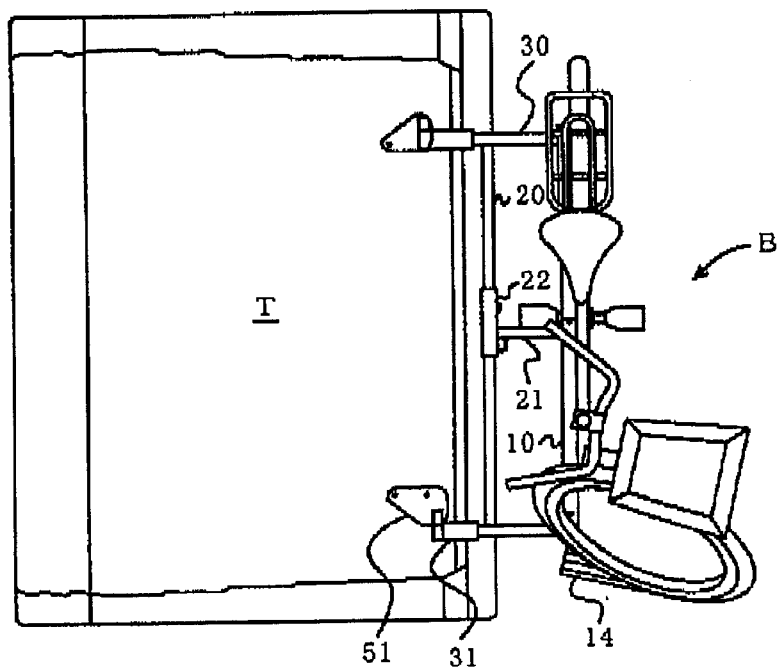
FIG. 5 is a top view showing the situation in which a bicycle is loaded.
Figure 6:
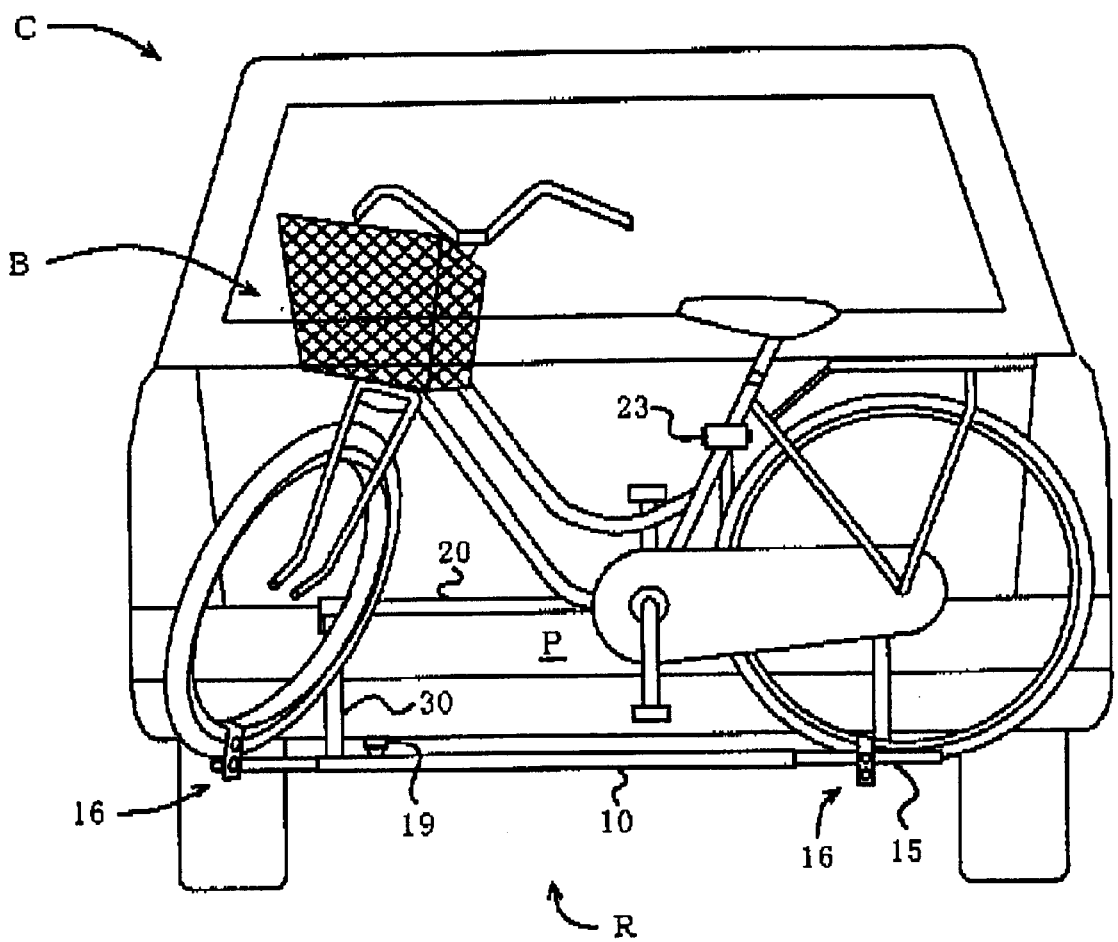
FIG. 6 is a front view showing the situation in which a bicycle is loaded.

The carrier fixing units F that can be mounted inside the car trunk each comprise a plate 51 having holes that correspond to the hole positions of the bumper mounting mechanisms of the car C, a support rod 52 fixed to the plate 51 in a perpendicular fashion, and a bearing 42 located at the other end of the support rod 52 as a rotating means, and a rotation shaft 41 is rotatably mounted to the bearing 42. The carrier fixing units F may be easily mounted to the car C by removing the bolts of the bumper mounting mechanism inside the trunk of the car C, aligning the plates 51 with the bolt holes, and reattaching the bolts. Where the trunk bottom has a double-plate construction comprising a trunk bottom plate t and a bumper mounting area f hollow cylinders 53 may be used in the gap therebetween, as shown in FIG. 2.

To load the bicycle B, first, the bicycle/wheelchair rack R of the car-mounted bicycle or wheelchair carrier A of the present invention that is rotatably connected to the carrier fixing units F mounted in the trunk T and runs substantially along the bottom of the trunk is rotated upward and outward out of the trunk using the rotation shafts as the axes until the buffer members 32 mounted to the vertical frame pipes 30 of the bicycle/wheelchair rack R make contact with the bumper P, whereby the bicycle/wheelchair rack is made ready for loading the bicycle B. Next, in order to adjust the distance between the front and rear wheel holders 11 and 12 in accordance with the distance between the front and rear wheels of the bicycle, the fixing bolt 19, which is located at the area where the front wheel rail support pipe 13 slides inside the wheel holder pipe 10 at one end thereof, is loosened, the front wheel holder 11 is rotated and slid into position, and after the fixing bolt 19 is tightened and locked with the front wheel holder 11 aligned horizontally, the front and rear wheels of the bicycle B are made to ride on the rails 14 and 15 of the front and rear wheel holders 11 and 12, respectively. The frame fixing arm 21 is then moved such that it meets the portion of the frame extending from the seat area to the pedals area of the bicycle B, whereupon the frame fixing arm 21 is fixed to the bicycle frame using the fixing belt 25, and the fixing bolt 24 is tightened and fastened so that the frame fixing arm 21 cannot be moved. Finally, the front and rear wheels of the bicycle B are fixed using the clamping means 16, and the bicycle may be transported. After the carrier is used, the bicycle/wheelchair rack R is stored in the trunk T by following in reverse sequence the steps by which the bicycle was loaded.

As shown in FIG. 1, number plate 90 and/or taillights 91 may be mounted at any desired position on the bicycle/wheelchair rack. By mounting a number plate and/or taillights onto the bicycle/wheelchair rack in this fashion, the number plate and taillights may be easily seen from the rear even when a bicycle, etc. is being transported.

Embodiment 2

Figure 7:
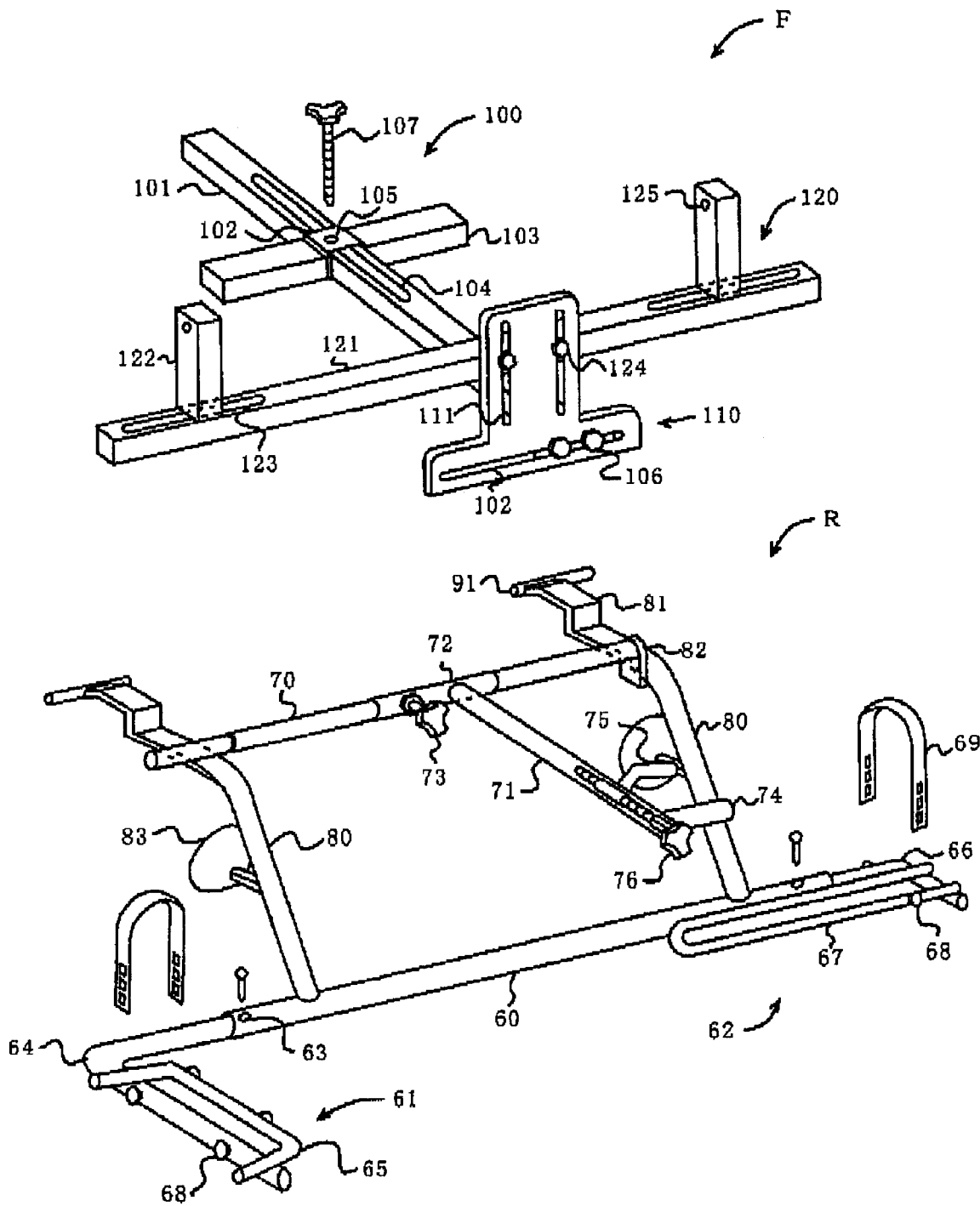
FIG. 7 is a perspective view of another example of the car-mounted bicycle or wheelchair carrier pertaining to the present invention in a disassembled fashion.

Another embodiment of the present invention will be explained in further detail with reference to FIG. 7.

This car-mounted bicycle or wheelchair carrier A comprises a carrier fixing unit F mounted in the trunk T of the car C and a bicycle/wheelchair rack R rotatably connected to the carrier fixing unit F in order to carry the bicycle B. The bicycle/wheelchair rack R also has a wheel holder pipe 60, a frame fixing pipe 70, and two vertical frame pipes 80. In the car-mounted bicycle or wheelchair carrier A of this embodiment, the positions of the rotating shaft pivots between the carrier fixing unit and the bicycle/wheelchair rack may be adjusted in the front-back, lateral and vertical directions.

The wheel holder pipe 60 is made of a pipe material that allows the front and rear wheel holders 61 and 62 to be attached and removed and allows their mounting positions to be adjusted, and has dimensions that allow it to fit within the width of the trunk opening. The vertical frame pipes 80 are integrally mounted to the middle of the wheel holder pipe 60 at positions that are off-center in either direction, and a stopping pin insertion hole 63 is formed in each left and right end area of the wheel holder pipe 60. The front wheel holder 61 comprises an L-shaped member 64 comprising a bent rod member having a diameter that allows it to fit inside the opening at one end of the wheel holder pipe 60, and a U-shaped member 65 that works together with the L-shaped member 64 to form the front wheel holder 61. The rear wheel holder 62 comprises an L-shaped member 66 comprising a bent rod member having a diameter that allows it to fit inside the opening at the other end of the wheel holder pipe 60, and a U-shaped member 67 that works together with the L-shaped member 66 to form the rear wheel holder 62. Multiple holes that align with the stopping pin insertion holes 63 are formed along the axial direction in the sections of the L-shaped members 64 and 66 that fit inside the openings at either end of the wheel holder pipe 60, so that the front wheel holder 61 and rear wheel holder 62 may be positioned at a prescribed angle, as well as adjusted such that the distance therebetween reflects the distance between the front and rear wheels of the bicycle. The front and rear wheels held by the front and rear wheel holders 61 and 62 are fixed to the front and rear wheel holders 61 and 62 through fixing protrusions 68 formed thereon and wheel fixing members 69 that engage with the fixing protrusions 68.

The frame fixing pipe 70 has a frame fixing arm 71 that immobilizes the frame of the bicycle B. The frame fixing arm 71 has a hollow cylinder 72 at one end that the frame fixing pipe 70 can pass through, and a clamping unit at the other end that fixes the frame of the bicycle B. The hollow cylinder 72 has a fixing bolt 73, and the frame fixing arm 71 can be rotated up and down while sliding laterally along the frame fixing pipe 70, or can be fixed at any position on the frame fixing pipe 70 such that the frame fixing arm 71 may be fixed to the frame of the bicycle B regardless of the type of bicycle. The clamping unit comprises a fixed clamp member 74 mounted to the outer circumference of the frame fixing arm 71, a movable clamp member 75 that protrudes outside the frame fixing arm 71 from a long hole formed in the frame fixing arm 71, and an operation handle 76, and is constructed such that the frame of the bicycle B is fixed by rotating the operation handle to move the movable clamp member 75.

The vertical frame pipes 80 are fixed such that they extend forward and upward toward either end of the wheel holder pipe 60 that runs laterally relative to the car C. A plate member 81 shaped so that it clears the trunk rear wall of the car C is fixed at one end area of each vertical frame pipe 80 via a protrusion 82 formed at one end thereof, and the frame fixing pipe 70 that runs laterally relative to the bar C is rotatably mounted between the plate members 81. Furthermore, a rotating shaft 91 is located at the end of each plate member 81 as a rotating means. A buffer member 83 is located in the area of contact between each vertical frame pipe 80 and the bumper P of the car C to prevent damage to the car C.

The carrier fixing unit F is mounted to the trunk interior using the screw located above the spare tire used for fixing the spare tire, and comprises a base mounting plate 100, a vertical mounting plate 110 and a horizontal mounting plate 120.

The base mounting plate 100 comprises square pillars formed in the shape of a cross. The square pillar 101 aligned in the front-back direction can slide relative to the square pillar 103 aligned in the lateral direction via an engaging member 102. A long hole 104 is formed in the square pillar 101 aligned in the front-back direction, and screw holes are located at the rear end thereof such that the lateral mounting position of the vertical mounting plate 110 can be adjusted using the bolts 106 inserted in the horizontal long hole 102 in the vertical mounting plate 110. The front-back position of the vertical mounting plate 110 can be fixed by aligning the screw hole 105 formed in the engaging member 102 with the spare tire fixing screw hole, sliding the square pillar 101 aligned in the front-back direction to a prescribed position, and fixing the square pillar 101 using the bolt 107.

The vertical mounting plate 110 is a plate in which are formed a pair of vertically aligned long holes 111 located in the upper part thereof, as well as a horizontally aligned long hole 102 formed in the lower part thereof. By inserting the bolts 106 in the horizontally aligned long hole 102 and the screw holes formed in the rear end of the square pillar 101, the lateral position of the vertical mounting plate 110 relative to the base mounting plate 100 can be fixed.

The horizontal mounting plate 120 comprises a main square pillar 121 and support pillars 122. Right and left slits 123 are formed at either end area of the main square pillar 121, and a pair of screw holes are formed in the lengthwise center area therein that are the same distance apart as the pair of vertical long holes 111 formed in the vertical mounting plate 110. The vertical mounting position of the horizontal mounting plate 120 can be adjusted by screwing the bolts 124 into this pair of screw holes via the pair of vertical long holes 111 formed in the vertical mounting plate 110. In addition, bearings 125 that rotatably support the rotation shafts 91 are formed in the mutually facing inner surfaces of the upper parts of the identically constructed support pillars 122. The distance between these support pillars 122 can be adjusted by moving the main square pillar 121 either independently or in a linked fashion along the lateral slits 123. After adjustment, the support pillars 122 are fixed via fixing screws.

The loading of the bicycle and the storage of the carrier in the trunk are carried out in the same fashion in the second embodiment and the first embodiment. Other than this, in the second embodiment, if the fixing screws for the support pillars 122 are loosened and the support pillars are moved outward, the engagement between the bearings 125 and the rotation shafts 91 supported thereby is terminated, the bicycle/wheelchair rack R and the carrier fixing unit F can be separated, and if the various fixing means for each member are removed, the two main components may be disassembled on a member-by-member basis where necessary.

Figure 8:
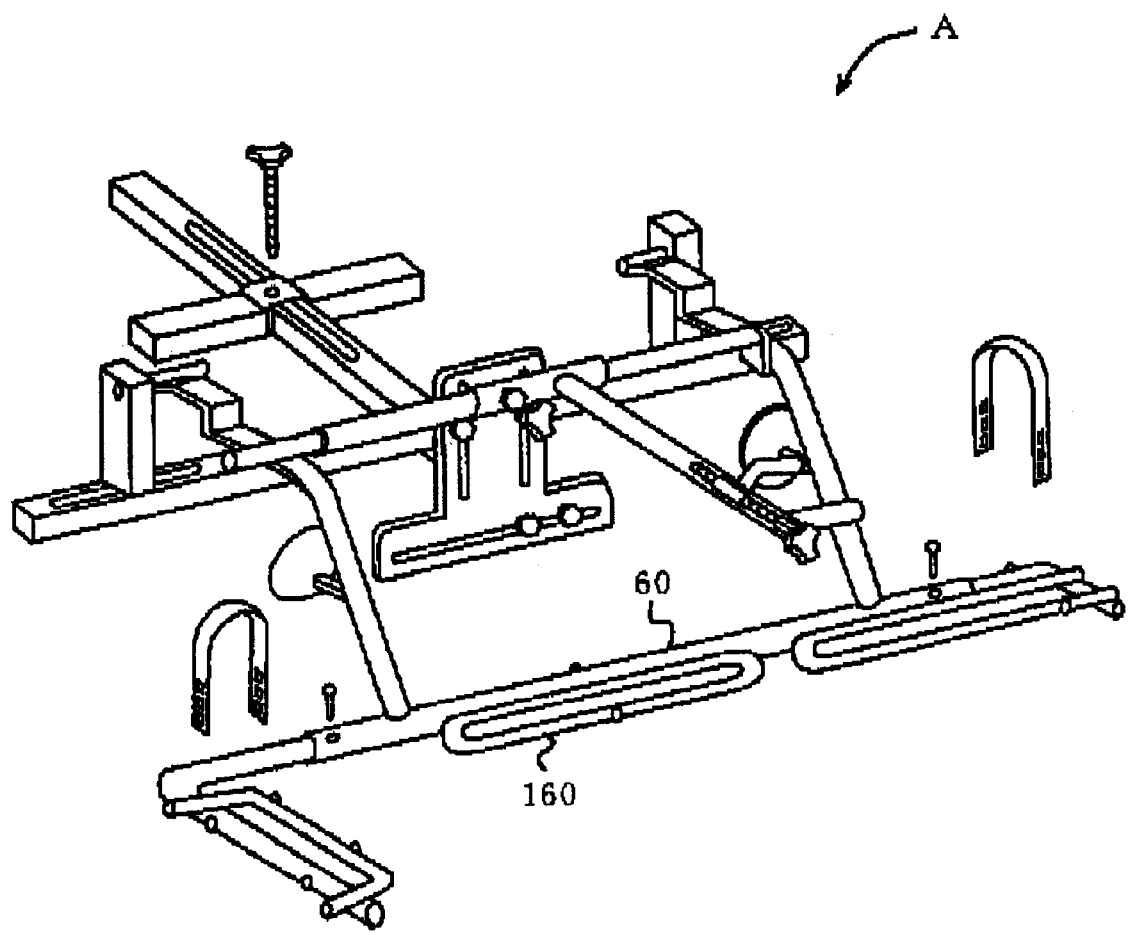
FIG. 8 is a perspective view showing an example of the car-mounted carrier pertaining to the present invention that may be used to transport either a bicycle or a wheelchair.

FIG. 8 shows a car-mounted combination bicycle/wheelchair rack in which a wheelchair wheel holder 160 is located in roughly the center of the wheel holder pipe 60 of the car-mounted bicycle or wheelchair carrier A of the above Embodiment 2.

As described above, when the bicycle/wheelchair rack of the car-mounted bicycle or wheelchair carrier of the present invention is stored in the trunk, because the rack is constructed such that it is lower than the trunk rear wall and runs substantially along the bottom of the trunk, space for carrying cargo is preserved. Moreover, using the car-mounted bicycle or wheelchair carrier of the present invention, because the bicycle or wheelchair fixing area is relatively low, such that a bicycle or wheelchair can be loaded on by one female person, and because the frame fixing arm can be moved in order to accommodate different types of bicycles, and the wheel holders, etc. can be adjusted in accordance with the distance between the wheels of the bicycle, various types of bicycles and wheelchairs may be transported.

What is claimed is:

1. A car-mounted bicycle or wheelchair carrier comprising:
    a carrier fixing unit adapted for being mounted inside a car trunk, said fixing unit having a pivot; and
    a bicycle/wheelchair rack rotatably connected to said pivot of said carrier fixing unit, said bicycle/wheelchair rack having a buffer member to contact with a back portion of the car when the bicycle/wheelchair rack is in use,
    wherein when the bicycle/wheelchair rack is stored inside the trunk, the bicycle/wheelchair rack is lower than the upper edge of the trunk rear wall and laid substantially along the bottom of the trunk.

2. The car-mounted bicycle or wheelchair carrier according to claim 1, wherein said carrier fixing unit comprises a fixing member to be mounted using the bumper mounting mechanisms at the trunk rear wall.

3. The car-mounted bicycle or wheelchair carrier according to claim 1, wherein said carrier fixing unit is designed so as to be mounted using the spare tire fixing mechanism inside the trunk.

4. The car-mounted bicycle or wheelchair carrier according to any of claims 1 through 3, wherein said carrier fixing unit is designed such that the position of said pivot between the carrier fixing unit and the bicycle/wheelchair rack can be adjusted in at least one of the front-back, lateral or vertical directions.

5. The car-mounted bicycle or wheelchair carrier according to any of claims 1 through 3, wherein said bicycle/wheelchair rack has
    a front wheel holder,
    a rear wheel holder, and
    a means for adjusting the distance between the front and rear wheel holders in accordance with the distance between the front and rear wheels of the bicycle,
    as well as a frame fixing unit adapted to immobilize the bicycle frame.

6. The car-mounted bicycle or wheelchair carrier according to any of claims 1 through 3, wherein said bicycle/wheelchair rack has
    a front wheel holder adapted to hold the front wheel of the bicycle such that the handlebars are turned, and
    a rear wheel holder adapted to hold the rear wheel such that it is parallel to the rear surface of the trunk,
    as well as clamping means for fixing the front and rear wheels to the front and rear wheel holders, respectively.

7. The car-mounted bicycle or wheelchair carrier according to any of claims 1 through 3, wherein said bicycle/wheelchair rack has
    one or two wheelchair wheel holders located parallel to the trunk rear surface,
    as well as a frame fixing unit adapted to fix the wheelchair frame.

8. The car-mounted bicycle or wheelchair carrier according to any of claims 1 through 3, wherein said bicycle/wheelchair rack has a number plate and/or taillights.

9. The car-mounted bicycle or wheelchair carrier according to any of claims 1 through 3, wherein said carrier fixing unit and bicycle/wheelchair rack are constituted from parts that can be assembled together.

10. The car-mounted bicycle or wheelchair carrier according to any of claims 1 through 3, wherein said bicycle/wheelchair rack has near the pivot a plate member having a configuration to clear the top edge of the trunk rear wall when the bicycle/wheelchair rack is in use.

11. A car-mounted bicycle or wheelchair carrier, comprising:
    a carrier fixing unit that is mounted at a prescribed position in the interior of the trunk; and
    a bicycle/wheelchair rack that is rotatably connected to the carrier fixing unit, and that is constructed such that when the bicycle/wheelchair rack is stored in the trunk, the bicycle/wheelchair rack is lower than the rear wall of the trunk and runs substantially along the bottom thereof, wherein:
        said carrier fixing unit has adjusting means permitting adjustment of the positions of the rotating shaft pivots between the carrier fixing unit and the bicycle/wheelchair rack in at least one of the front-back, lateral or vertical directions;

said bicycle/wheelchair rack has a wheel holder pipe and a frame fixing, pipe that are parallel to each other, vertical frame pipes that are perpendicular to these pipes and parallel to each other, and two plate members that are integrally formed with the ends of the vertical frame pipes near the rotating shaft pivots, and shaped such that they clear the top edge of the trunk rear wall;

said wheel holder pipe has (1) a front wheel holder adapted to hold the front wheel of the bicycle such that the handlebars are turned, a rear wheel holder adapted to hold the rear wheel such that it is parallel to the rear surface of the trunk, and an adjusting means for adjusting the distance between the front and rear wheel holders in accordance with the distance between the front and rear wheels of the bicycle, and/or (2) a wheelchair wheel holder;

said frame fixing pipe has a frame fixing arm that is rotatably fixed at any desired position along the frame fixing pipe to fix the frame of the bicycle;

each of said vertical frame pipes has a buffer member located at the contact part between the vertical frame pipe and the bumper; and said car-mounted bicycle or wheelchair carrier also has clamping means for fixing the front and rear wheels to their respective front and rear wheel holders.

* * * * *